United States Patent
Hashiguchi (10) Patent No.: US 9,842,260 B2
(45) Date of Patent: Dec. 12, 2017

(54) IMAGE PROCESSING APPARATUS AND IMAGE PROCESSING METHOD OF PERFORMING IMAGE SEGMENTATION

(71) Applicant: CANON KABUSHIKI KAISHA, Tokyo (JP)

(72) Inventor: Noriyasu Hashiguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 15/058,397

(22) Filed: Mar. 2, 2016

(65) Prior Publication Data

US 2016/0267356 A1    Sep. 15, 2016

(30) Foreign Application Priority Data

Mar. 9, 2015   (JP) ................. 2015-046343

(51) Int. Cl.
```
G06K 9/00      (2006.01)
G06T 7/11      (2017.01)
G06T 7/187     (2017.01)
G06K 9/62      (2006.01)
```

(52) U.S. Cl.
CPC ....... *G06K 9/00771* (2013.01); *G06K 9/6218* (2013.01); *G06T 7/11* (2017.01); *G06T 7/187* (2017.01)

(58) Field of Classification Search
CPC . G06T 7/11; G06T 7/187; G06T 2207/10016; G06K 9/00711; G06K 9/6218; G06K 9/6223

See application file for complete search history.

(56) References Cited

U.S. PATENT DOCUMENTS

| | | | | |
|---|---|---|---|---|
| 6,763,137 B1 * | 7/2004 | Krtolica | ............... | G06K 9/4638 382/204 |
| 2001/0051872 A1 * | 12/2001 | Kagoshima | ............. | G10L 13/10 704/260 |

(Continued)

OTHER PUBLICATIONS

U.S. Appl. No. 14/951,693, filed Nov. 25, 2015, Inventor Noriyasu Hashiguchi.

(Continued)

*Primary Examiner* — Jingge Wu
(74) *Attorney, Agent, or Firm* — Carter, DeLuca, Farrell & Schmidt, LLP (57) ABSTRACT

A clustering processing unit sets representative data to be used in first clustering, for each of temporally continuous images, and repeats clustering of pixels based on the representative data. A representative data updating unit updates the representative data whenever clustering is repeated. As the representative data to be used in first clustering of each image, an initial value or representative data used in last clustering of an immediately preceding image is set based on predetermined input information. An example of the predetermined input information is operation information for an image capturing unit for capturing an image. If a dead cluster predictively forms due to an image change, the initial value is set as the representative data. This makes it possible to restrict accumulation of dead clusters, and suppress the decrease in segmentation accuracy.

16 Claims, 8 Drawing Sheets

(56) References Cited

U.S. PATENT DOCUMENTS

| | | | | |
|---|---|---|---|---|
| 2008/0123945 | A1* | 5/2008 | Andrew | G06K 9/00456 382/164 |
| 2009/0232515 | A1* | 9/2009 | Marien | H04B 10/116 398/182 |
| 2009/0285454 | A1* | 11/2009 | Xu | G06K 9/00221 382/118 |
| 2009/0309961 | A1* | 12/2009 | Miyashita | G06K 9/6251 348/65 |
| 2010/0202685 | A1* | 8/2010 | Naito | G06K 9/38 382/164 |
| 2011/0007977 | A1* | 1/2011 | Amonou | H04N 19/126 382/233 |
| 2011/0019927 | A1* | 1/2011 | Nagamatsu | G06K 9/38 382/225 |
| 2011/0026841 | A1* | 2/2011 | Okawa | G06K 9/38 382/225 |
| 2012/0188351 | A1* | 7/2012 | Kaku | G06T 7/0016 348/65 |
| 2012/0233303 | A1* | 9/2012 | Choi | H04L 67/306 709/222 |
| 2013/0266219 | A1* | 10/2013 | Kurita | G06T 5/002 382/167 |
| 2015/0098652 | A1* | 4/2015 | Chen | G06T 7/0081 382/180 |
| 2015/0169978 | A1* | 6/2015 | Pillai | G06K 9/00288 382/195 |
| 2016/0004764 | A1* | 1/2016 | Chakerian | G06F 17/212 707/737 |
| 2016/0098843 | A1 | 4/2016 | Hashiguchi | |

OTHER PUBLICATIONS

Achanta et al., "SLIC Superpixels", EPFL Technical Report 149300, Jun. 2010, pp. 1-15.

Ren et al., "gSLIC: a real-time implementation of SLIC superpixel segmentation", University of Oxford, Department of Engineering, Technical Report, Jun. 2011, pp. 1-6.

Maruyama, "Real-time K-Means Clustering for Color Images on Reconfigurable Hardware", International Conference on Pattern Recognition, 2006, pp. 816-819.

\* cited by examiner

FIG. 3A
INITIAL LAYOUT OF REPRESENTATIVE DATA

FIG. 3B
RELATIONSHIP BETWEEN REPRESENTATIVE DATA AND PIXEL

FIG. 3C
INDICES OF REPRESENTATIVE DATA

FIG. 3D
SEGMENTATION RESULT (LABEL MAP)

FIG. 4A

RESULT OF SEGMENTATION OF WHITE IMAGE

FIG. 4B

RESULT OF SEGMENTATION OF IMAGE CONTAINING BLACK OBJECT

FIG. 4C

STATE IN WHICH DEAD CLUSTER FORMS

FIG. 4D

RESULT OF CLUSTERING PROCESS PERFORMED BY CORRECTING DEAD CLUSTER

FIG. 5B  OVERLAPPING PARTIAL AREAS

FIG. 5A  PARTIAL AREAS ARE SET

FIG. 6

IMAGE PROCESSING APPARATUS AND IMAGE PROCESSING METHOD OF PERFORMING IMAGE SEGMENTATION

BACKGROUND OF THE INVENTION

Field of the Invention

The present invention relates to an image processing apparatus and image processing method of performing image segmentation.

Description of the Related Art

A segmentation method is used as a technique of dividing an image into a plurality of areas so that the attributes such as the colors, patterns, and brightnesses of these areas are the same. Since various kinds of image processing can be performed on these divided areas one by one, the operation amount can be reduced compared to a case in which an image is processed pixel by pixel.

Several methods have been proposed to increase the speed of the segmentation process. An example is R. Achanta, A. Shaji, K. Smith, A. Lucchi, P. Fua, and S, Süsstrunk, "SLIC Superpixels," tech. rep., EPFL, EPFL, 2010. (to be referred to as literature 1 hereinafter). Literature 1 has disclosed a method of dividing an image into a plurality of areas by clustering image data by using five-dimensional information containing color information (l, a, b) and coordinates (X, Y). This method described in literature 1 is called Simple Linear Iterative Clustering (SLIC). In this SLIC method, representative data as the centers of clusters are arranged in a matrix in an image. This representative data in the SLIC method has five-dimensional information containing color information (l, a, b) and coordinates (X, Y), and is also called a seed or cluster centroid. An area obtained by clustering is called a superpixel. The SLIC method is based on the k-means method as one clustering method, and clusters pixel data to the representative data arranged in a matrix. Then, each representative data is updated by using the five-dimensional information of the clustered pixel data, and clustering is performed again. The SLIC method obtains the segmentation result by repeating clustering and update once or more. The difference between the SLIC method and k-means method is that the range of pixel data to be clustered to the representative data is limited.

Also, C. Y. Ren and I. Reid. gSLIC: a real-time implementation of SLIC superpixel segmentation. University of Oxford, Department of Engineering, Technical Report, 2011. (to be referred to as literature 2 hereinafter) has disclosed a method of increasing the speed of the method of literature 1 by using a GPU (Graphic Processing Unit). Literature 2 has proposed a hierarchical clustering scheme in order to implement high-speed processing by the GPU, thereby implementing a high-speed segmentation process for a high-resolution image.

In addition, T. Maruyama, "Real-time K-Means Clustering for Color Images on Reconfigurable Hardware", International Conference on Pattern Recognition, pp. 816-819, 2006 (to be referred to as literature 3 hereinafter) has disclosed a method of increasing the speed of the k-means process by improving a representative data initial value setting method. When processing a plurality of similar images in order, this method of literature 3 normally processes the first image, and processes the second and subsequent images by using representative data obtained by preceding images, thereby reducing the repeat count and increasing the processing speed.

When applying the speed increasing method as disclosed in literature 3 to a moving image, however, if a camera is moved, scenes are changed, or an image has largely changed, a phenomenon in which no pixel data is clustered to representative data occurs. This phenomenon is called a dead cluster, dead centroid, or empty cluster. In this specification, the phenomenon will be called a dead cluster. If this dead cluster forms, the number of areas reduces, and the segmentation accuracy decreases.

SUMMARY OF THE INVENTION

The present invention provides a technique of suppressing a decrease in segmentation accuracy when dividing each of temporally continuous images into a plurality of areas.

According to an aspect of the present invention, there is provided an image processing apparatus comprising: a setting unit configured to set representative data to be used in first clustering, for each of temporally continuous images; a clustering unit configured to repeat clustering of pixels in the image based on the representative data; an updating unit configured to update the representative data whenever the clustering is repeated; and a determining unit configured to determine whether to use representative data updated after last clustering of an immediately preceding image as representative data for a current image, wherein the setting unit sets the representative data for the current image based on the determination result obtained by the determining unit.

The present invention can suppress a decrease in segmentation accuracy when dividing each of temporally continuous images into a plurality of areas.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be explained below with reference to the accompanying drawings. Note that the following embodiments do not limit the present invention according to the scope of claims, and not all combinations of features explained in the embodiments are essential to the means of solution of the present invention.

First Embodiment

Apparatus Arrangement

Figure 1:
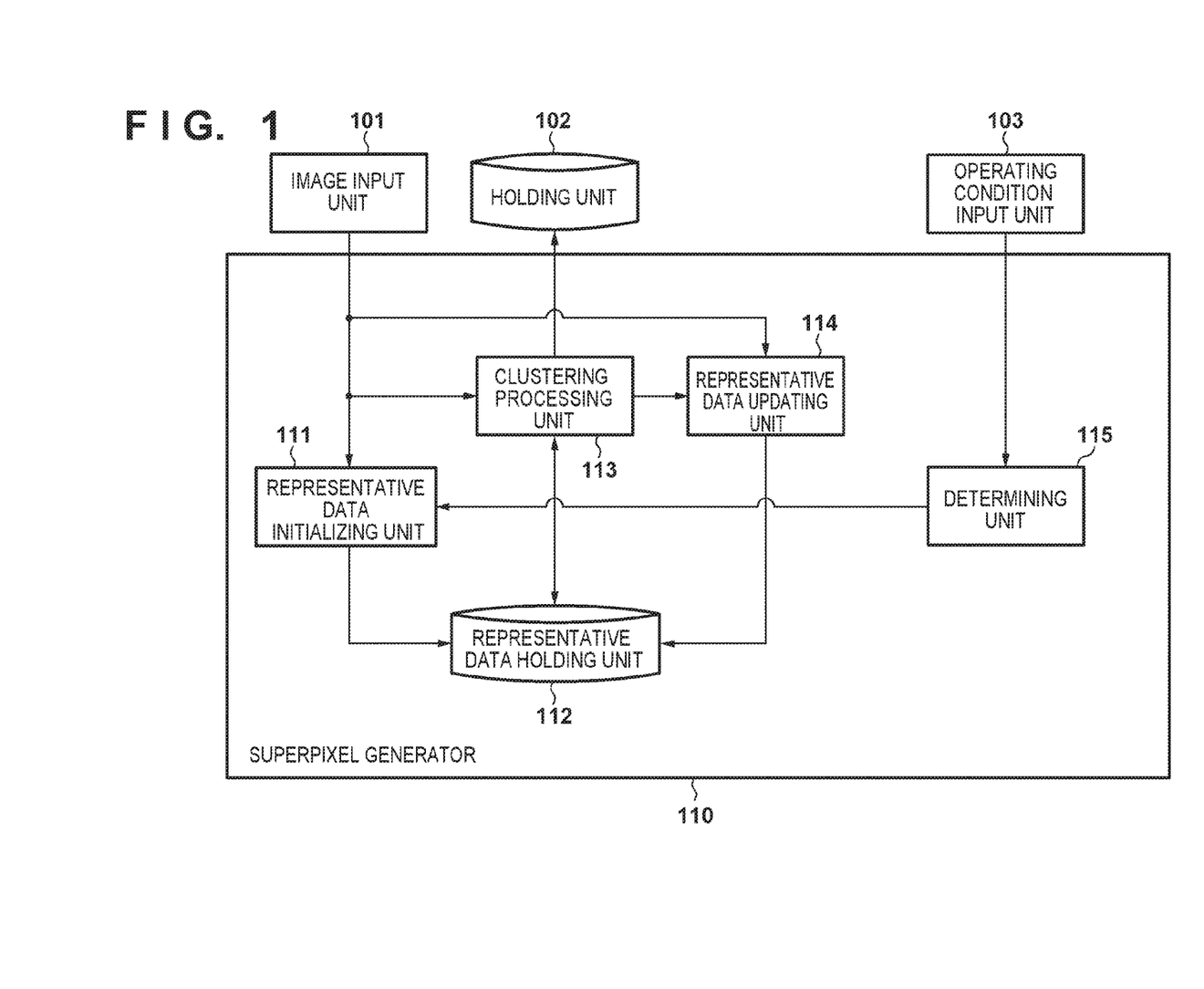
FIG. 1 is a block diagram showing the arrangement of a segmentation apparatus according to an embodiment.

FIG. 1 shows the block configuration of an image processing apparatus according to this embodiment. The image processing apparatus of this embodiment is a segmentation apparatus which performs segmentation by repeating a process of clustering a pixel based on representative data for each of temporally continuous images.

An image input unit 101 includes a driver circuit for controlling an optical-system device and photoelectric conversion device, an A/D converter, a signal processing circuit for performing various kinds of image correction, and a frame buffer. The function of the image input unit 101 is to form an image of input light and output image data. Image data to be processed in this embodiment is an RGB color image obtained from visible light. However, it is also possible to use a gray image representing luminance, or an image obtained by capturing an ultraviolet region or infrared region of invisible light, so the type and format of an input image do not limit the present invention. Note that the image input unit 101 captures an image by 30 frames per sec.

An operating condition input unit 103 inputs the operating condition of an apparatus including the segmentation apparatus. This embodiment will be explained by assuming that the apparatus is a remotely operable stationary image capturing apparatus (to be referred to as a surveillance camera hereinafter). Assume also that operation information is input as the operating condition from a remote place in order to change the image capturing range of the surveillance camera. Surveillance camera remote operations include the operations of pan, tilt, and zoom. Pan is the horizontal movement of the camera, and tilt is the vertical movement of the camera. Zoom is an operation of obtaining an enlarged close-up image or distant wide-range image of an object by controlling lenses. The operating condition input unit 103 inputs these pieces of pan, tilt, and zoom operation information.

A superpixel generator 110 generates a superpixel by performing a segmentation process on the image obtained by the image input unit 101 by clustering. The superpixel generator 110 includes a representative data initializing unit 111, representative data holding unit 112, clustering processing unit 113, representative data updating unit 114, and determining unit 115. The operation of each unit will be explained in detail later. The superpixel generation of this embodiment uses the SLIC-based method used in literature 2. This embodiment will be explained below by using color information (R, G, B) of pixel data as an image feature.

An outline of the segmentation apparatus shown in FIG. 1 is as follows. That is, a moving image is input frame by frame from the image input unit 101, and the result of processing by the superpixel generator 110 is output to an area holding unit 102. The superpixel generator 110 clusters pixel data to representative data. This clustering is repeated once or more, and the representative data is updated for each repetition. For each of the second and subsequent frames, the superpixel generator 110 determines whether to take over representative data obtained by segmenting a preceding frame image, or use the initial value of the representative data. This determination is performed based on input information from the operating condition input unit 103. In this embodiment, a process of setting a predetermined initial value for the representative data will be referred to as initialization hereinafter.

Segmentation Process

The procedure of the segmentation process of this embodiment will be explained below with reference to flowcharts of FIGS. 2A and 2B.

In step S201, a frame image loop is started.

In step S202, the operating condition input unit 103 inputs operation information. This operation information indicates the presence/absence of pan, tilt, and zoom operation instructions. The operation information input from the operating condition input unit 103 is input to the determining unit 115.

In step S203, the determining unit 115 determines whether to initialize representative data in accordance with whether there is an operation instruction. If there is an operation instruction, the segmentation apparatus of this embodiment initializes the value of the representative data. If there is no operation instruction, the segmentation apparatus takes over representative data obtained by segmenting a preceding frame image. By taking over the representative data from the preceding frame, it is possible to reduce the repeat count of clustering and increase the speed of the processing as explained in literature 3.

Representative data is set based on the result of determination of whether to initialize the representative data in step S203. That is, if it is determined to initialize the representative data, the process advances to step S204, and the representative data is initialized. If it is determined not to initialize the representative data, the process advances to step S205, and the process of taking over representative data is performed. However, it is necessary to initialize the representative data for the first time of the frame image loop, that is, for the first frame, so the process advances to step S204.

In step S204, the representative data initializing unit 111 initializes the representative data. The representative data of this embodiment has five-dimensional information containing color information (R, G, B) and coordinates (X, Y). FIG. 3A shows an initial layout example of the coordinates (X, Y) of the representative data. In FIG. 3A, reference numeral 301 represents an image, and each circle arranged inside the image 301 represents the position of each representative data. S represents the spacing between the representative data. Representative data 302 has X and Y at the positions of S/2 and S/2 from the upper left corner of the image as the origin. By using the representative data 302 as a start point, the coordinates (X, Y) of each representative data are set in the form of a matrix having the spacing S. Also, the color information (R, G, B) is set by a pixel value of the image 301, which corresponds to the coordinates at which the representative data is arranged. The representative data initialized by the above processing are saved in the representative data holding unit 112.

On the other hand, in step S205, the process of taking over and setting the updated representative data of a preceding frame is performed. Details of this process will be described later.

In step S206, the clustering processing unit 113 sets the repeat count of clustering, and starts a repetitive calculation loop (steps S206 to S215). As the repeat count, a value of 1 or more is set.

In step S207, an input data loop (steps S207 to S210) is started. Input data is pixel data, and the clustering processing unit 113 scans the image in raster order from the upper left corner of the image, and clusters all input data by repeating steps S208 to S210. The clustering processing unit 113 performs this process.

In step S208, a distance $D_s$ between the pixel data and corresponding representative data is calculated. FIG. 3B shows the correspondence between the pixel data and representative data. In FIG. 3B, each circle in an image 311 indicates representative data, and a square 321 indicates pixel data. This pixel data is associated with 3×3 representative data arranged around the pixel data. For example, the pixel data 321 is associated with representative data 312 to 320 around the pixel data 321. This distance calculation in step S208 is performed between each pixel data and 3×3 representative data around the pixel data. The calculation of the distance $D_s$ is indicated by:

$$d_{rgb} = \sqrt{(r_k - r_i)^2 + (g_k - g_i)^2 + (b_k - b_i)^2} \quad (1)$$
$$d_{xy} = \sqrt{(x_k - x_i)^2 + (y_k - y_i)^2}$$
$$D_S = d_{rgb} + \frac{m}{s} d_{xy}$$

In equation (1), the color information (R, G, B) of the kth representative point is $(r_k, g_k, b_k)$, and the coordinates (X Y) thereof are $(X_k, Y_k)$. k takes a value of 0 to K−1 when the total number of representative points arranged at the spacing S is K. Letting i be a pixel position in the image 301, the color information of the ith pixel position is represented by $(r_i, g_i, b_i)$. Similarly, the coordinates (X, Y) of the ith pixel position are represented by $(x_i, y_i)$. Also, m is a parameter representing a weight when adding up a distance $d_{rgb}$ on the color space and a distance $d_{xy}$ on the coordinate space.

In step S209, the clustering processing unit 113 performs a process of attributing the input data to the nearest representative data. More specifically, of 3×3 representative data around pixel data, representative data having the shortest distance $D_s$ to the pixel data is selected. As shown in FIG. 3C, indices are assigned to the representative data arranged in the image 301. In step S209, therefore, a label map as shown in FIG. 3D is formed for each pixel data by using the index of selected representative data as a label value, and supplied to the area holding unit 102.

In step S210, whether all the input data are processed is determined. If all the input data are processed, the process advances to step S211, and the input data loop is terminated. If there is unprocessed input data, the process returns to step S208, and processing of the next input data is started.

In step S211, a representative data updating loop (steps S211 to S214) in the representative data updating unit 114 is started.

In step S212, the representative data updating unit 114 calculates accumulated values of the color information (R, G, B) and coordinate information (X, Y) from the pixel data attributed to the representative data, and divides the accumulated values by the number of pixel data. That is, updated values of the color information (R, G, B) and coordinate information (X, Y) are obtained by calculating the average value of each information. The updated values of the representative data obtained in step S212 are saved in the representative data holding unit 112 in step S213.

In step S214, the representative data updating unit 114 determines whether update of all the representative data is complete. If the update is complete, the process advances to step S215, and the representative data updating loop is terminated. If the update of all the representative data is not complete, the process returns to step S212, and a process of updating the next representative data is started.

In step S215, the clustering processing unit 113 determines whether the repetitive calculation has exceeded a predetermined count. If the repetitive calculation has exceeded the count, the clustering processing unit 113 terminates the repetitive calculation. If the repetitive calculation has not exceeded the count, the process returns to step S207, and the clustering processing unit 113 starts a repetitive calculation of the next clustering. In the next clustering, the clustering processing unit 113 performs the processes in steps S207 to S214 by using the updated representative data.

On the other hand, if the repetitive calculation has exceeded the predetermined count, the repetitive calculation is terminated, and the process advances to step S216. In this state, the label map saved in the area holding unit 102 is the frame image segmentation result.

In step S216, whether frame image input is complete is determined. If the input is complete, the frame image loop is terminated. If the input is not complete, the process returns to step S202, and processing of the next frame image is started.

Initialization/Taking Over of Representative Data by Presence/Absence of Operation Instruction The segmentation process according to this embodiment has been explained above. In this embodiment, representative data to be used in first clustering when segmenting a frame of interest is determined in accordance with the presence/absence of an operation instruction. That is, the feature of this embodiment is to determine whether to initialize representative data or take over representative data of a preceding frame image, in accordance with the presence/absence of an operation instruction. Representative data processing based on the presence/absence of an operation instruction will be explained in detail below.

In this embodiment as described above, operation information is acquired from the operating condition input unit 103 in step S202, and whether to initialize representative data is determined in step S203 in accordance with the presence/absence of an operation instruction indicated by the operation information.

First, processing when there is no operation instruction will be explained. When there is no operation instruction, it is determined not to initialize representative data in step S203, and the process advances to step S205. In step S205, representative data obtained by updating a preceding frame image is set as first representative data in the second and subsequent frame image loops. That is, representative data set in the preceding frame image is taken over. More specifically, the representative data to be taken over is representative data obtained by the representative data updating process in steps S211 to S214 in the last loop of the repetitive calculation in steps S206 to S215. The updated representative data is held in the representative data holding unit 112, and set as first representative data in the second or subsequent loop processing.

Next, processing when there is an operation instruction will be explained. When there is an operation instruction, it is determined to initialize representative data in step S203, and the process advances to step S204. In step S204, the determining unit 115 instructs the representative data initializing unit 111 to perform initialization, thereby initializing the representative data held in the representative data holding unit 112.

In this embodiment as described above, representative data is initialized in accordance with the presence/absence of an operation instruction for the following reason. When performing a clustering process on a given frame by taking over representative data obtained by a preceding frame image, a dead cluster sometimes forms due to a large change in an image, for example, movement of an object across the image. As described earlier, a dead cluster is a state in which no pixel data belongs to representative data. The processing speed is increased by taking over representative data, but dead clusters are continuously accumulated whenever a large change occurs in an image. If dead clusters increase, the number of divided areas reduces, so the segmentation accuracy deteriorates. In this embodiment, therefore, representative data is initialized in accordance with the operating condition (the presence/absence of an operation instruction), thereby suppressing the continuous accumulation of dead clusters, and minimizing the deterioration of the segmentation accuracy caused by the formation of a dead cluster.

The cause of the formation of a dead cluster will be explained below with reference to FIGS. 4A to 4D. FIGS. 4A to 4D show a clustering example when a black object passes across an image capturing area having a white wall as a background, by assuming a status in which a change occurs, for example, an object such as a person or automobile moves across an area in which image capturing is performed.

Figure 4A:
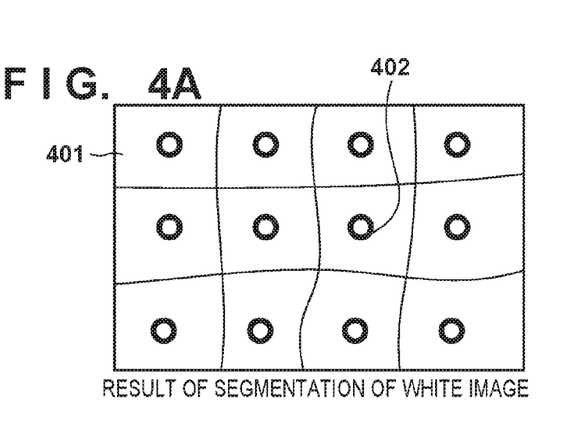
FIGS. 4A to 4D are views for explaining the formation of a dead cluster in the embodiment.
Figure 4B:
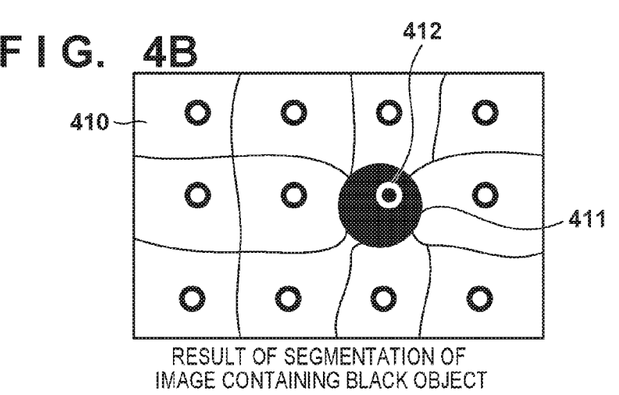
Figure 4C:
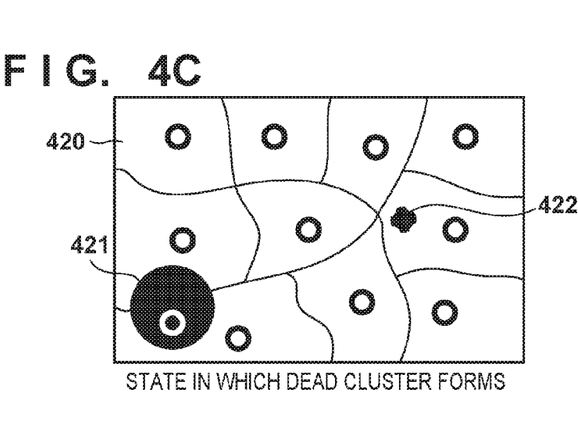

FIG. 4A shows the result of segmentation of an image 401 entirely showing a white wall, and each circle 402 is representative data. The color information of the representative data in FIG. 4A is white. FIG. 4B shows the result of segmentation of an image when an image 410 identical to the image 401 contains a black object 411. Black pixel data existing in the area of the black object 411 is clustered to representative data 412 having a short coordinate distance. Accordingly, segmentation causes the color information of the representative data 412 to become black. FIG. 4C shows the result of segmentation of an image 420 in which a group of black pixels clustered to the representative data 412 in FIG. 4B has moved as a black object 421. When the image 420 is clustered, the distance from black representative data 422 to white pixel data becomes longer than distances to peripheral representative data. Since no pixel data belongs to the black representative data 422, the black representative data 422 becomes a dead cluster.

In this embodiment as described above, representative data obtained by a preceding frame is taken over in step S205, and representative data having become a dead cluster is also similarly taken over. As the frame image loop advances, representative data having become dead clusters are gradually accumulated. Some dead clusters are eliminated in some cases, but most dead clusters are continuously accumulated.

Generally, remote operations of pan, tilt, and zoom largely change an image, so many dead clusters predictively form if these operation instructions exist. In this embodiment, therefore, if there is a pan, tilt, or zoom operation instruction, representative data is initialized in steps S202, S203, and S204, thereby avoiding continuous accumulation of dead clusters.

Figure 4D:
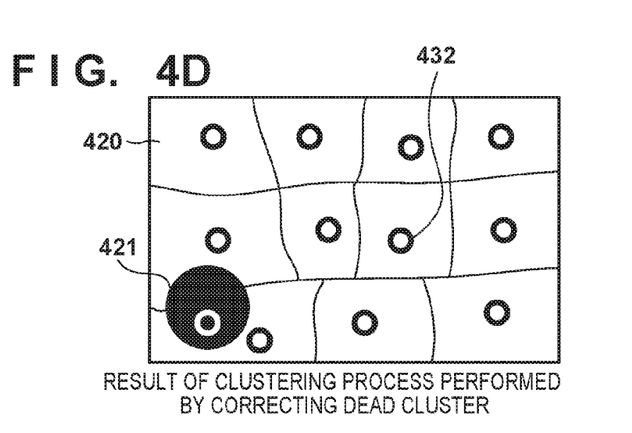

FIG. 4D shows the result of the segmentation process of this embodiment. That is, FIG. 4D shows the result of segmentation performed by applying the method of this embodiment on the image 420 in which the group of black pixels clustered to the representative data 412 in FIG. 4B has moved as the black object 421. In FIG. 4C, the black representative data 422 becomes a dead cluster. In FIG. 4D, however, the black representative data 422 is initialized to white representative data 432, so the dead cluster disappears.

In this embodiment as explained above, whether to initialize or take over representative data is controlled in accordance with the presence/absence of an operation instruction which predictively forms a dead cluster by a large image change. This makes it possible to restrict the accumulation of dead clusters, and suppress the decrease in segmentation accuracy.

Note that this embodiment has disclosed the example in which initialization of representative data is controlled by a binary value representing the presence/absence of an operation instruction by a remote operation of a surveillance camera. However, the operation information is sometimes represented by a multilevel value, instead of a binary value, such as information representing the operation speed. In this case, the determining unit 115 receives multilevel operation information, and compares the information with a threshold value. That is, the determining unit 115 performs initialization if the value indicating the operation speed exceeds the threshold value, and takes over representative data of a preceding frame if the value is less than the threshold value. That is, the determining unit 115 performs initialization if the operation speed is high, and performs the process of taking over if the operation speed is low. It is also possible to determine the presence/absence of operation information of pan, tilt, and zoom as operations of a surveillance camera by using different threshold values.

In addition, this embodiment has disclosed the example in which a surveillance camera is remotely controlled across a network. However, an operation by a remote controller of a surveillance camera and an operation by a button of a surveillance camera can also be similarly processed as operation information.

Furthermore, this embodiment has explained a pan, tilt, or zoom operation as an example of an operation instruction, but the present invention is not limited to this example. For example, the present invention is also applicable to another operation instruction such as a scene change. An operation of the scene change will be explained below. It is possible to set one or more partial images from an image captured by a camera including a fisheye lens, and obtain an image by correcting distortion of the selected partial images by geometric transformation. The scene change is an operation instruction of selecting one of the plurality of partial images. This scene change operation is similarly performed in a camera including a telephoto lens or wide-angle lens instead of a fisheye lens. When the scene change is performed, a large change occurs in the image, so the possibility of the formation of a dead cluster is high. Upon receiving an operation instruction of this scene change, therefore, the segmentation apparatus of this embodiment suppresses the formation of a dead cluster by initializing representative data.

Other Embodiments

The above-described first embodiment has disclosed the example in which initialization determination is performed by using operation information when remotely operating a surveillance camera, but the present invention is not limited to this example. As described previously, when segmenting a frame of interest, a dead cluster easily forms if a large change occurs in the image between the frame of interest and a preceding frame. Accordingly, representative data initialization determination according to the present invention need only be performed in accordance with not only the above-described operation information but also the occurrence of a change in image between frames, or information indicating prediction of the occurrence.

For example, even when there is no motion on a surveillance camera, a large change in image which causes the formation of a dead cluster can occur in various image capturing scenes or statuses, such as a case in which a train or automobile moves across an image. When there is no motion on a surveillance camera as described above, it is effective to regularly initialize representative data. This regular initialization can be performed by, for example, inputting the value of a timer from the operating condition input unit 103, or inputting the count value of a frame image input from the image input unit 101. When using the timer, the determining unit 115 determines whether a predetermined time has elapsed. When using the count value of a frame image, the determining unit 115 performs determination by which initialization is performed once for 100 frames. Initialization determination may also be performed by referring to image capturing time information attached to a frame image.

The present invention is not limited to regular initialization as described above. If a time zone in which dead clusters easily form is already known, irregular initialization may also be performed by, for example, increasing the initialization frequency in the time zone. That is, the interval and timing of initialization can be determined in accordance with the capturing date/time of an image.

There is also a method of determining the initialization timing by sensing a change in operation environment. For example, there is a method of performing initialization determination in accordance with the illuminance of an image capturing environment, which is measured by using an illuminance sensor. When a surveillance place of a surveillance camera is an indoor place, a large change occurs in the whole image if an illumination switch of an indoor fluorescent lamp is turned on or off, so a dead cluster readily forms. Therefore, initialization of representative data is controlled by sensing a change in image capturing environment caused by ON/OFF of the illumination switch by a signal change of an illuminance sensor. More specifically, the value of illuminance obtained by the signal of the illuminance sensor is received from the operating condition input unit 103, and the determining unit 115 initializes representative data if the illuminance exceeds a predetermined threshold value. Note that it is also possible to use a plurality of threshold values, and initialize representative data at a timing at which the illuminance exceeds each threshold value.

Also, the processing of a surveillance camera has been explained as an example, but it is similarly possible to perform representative data initialization determination when performing segmentation in a portable camera such as a handy video camera. When using a portable camera, it is also effective to perform initialization determination in accordance with a change in frame image, based on a signal from an acceleration sensor or gyro sensor instead of an illuminance sensor. The above-described first embodiment has disclosed the example in which the motion of a surveillance camera is detected by a remote operation or button operation. When using a portable camera, however, it is necessary to take account of the motion of an arm. Since many dead clusters predictively form due to the motion of an arm as well, representative data initialization determination need only be performed by detecting the motion of a camera by using a signal from an acceleration sensor or gyro sensor.

Figure 5A:
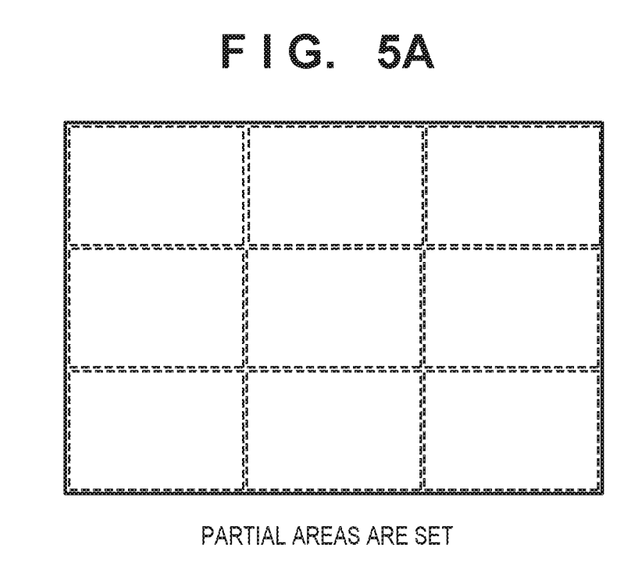
FIGS. 5A and 5B are views for explaining partial areas according to another embodiment.
Figure 5B:
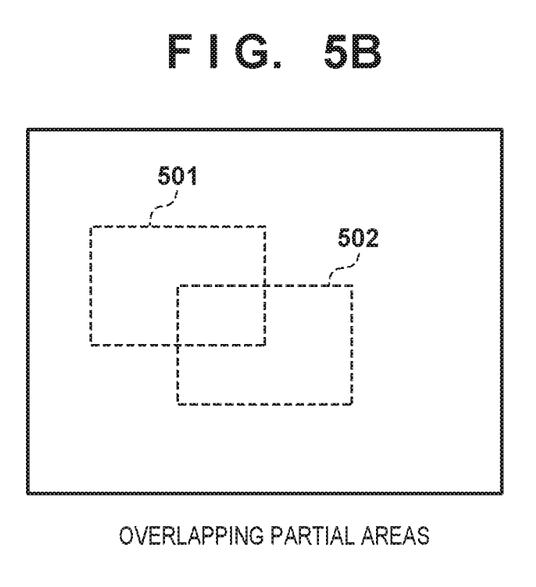
Figure 6:
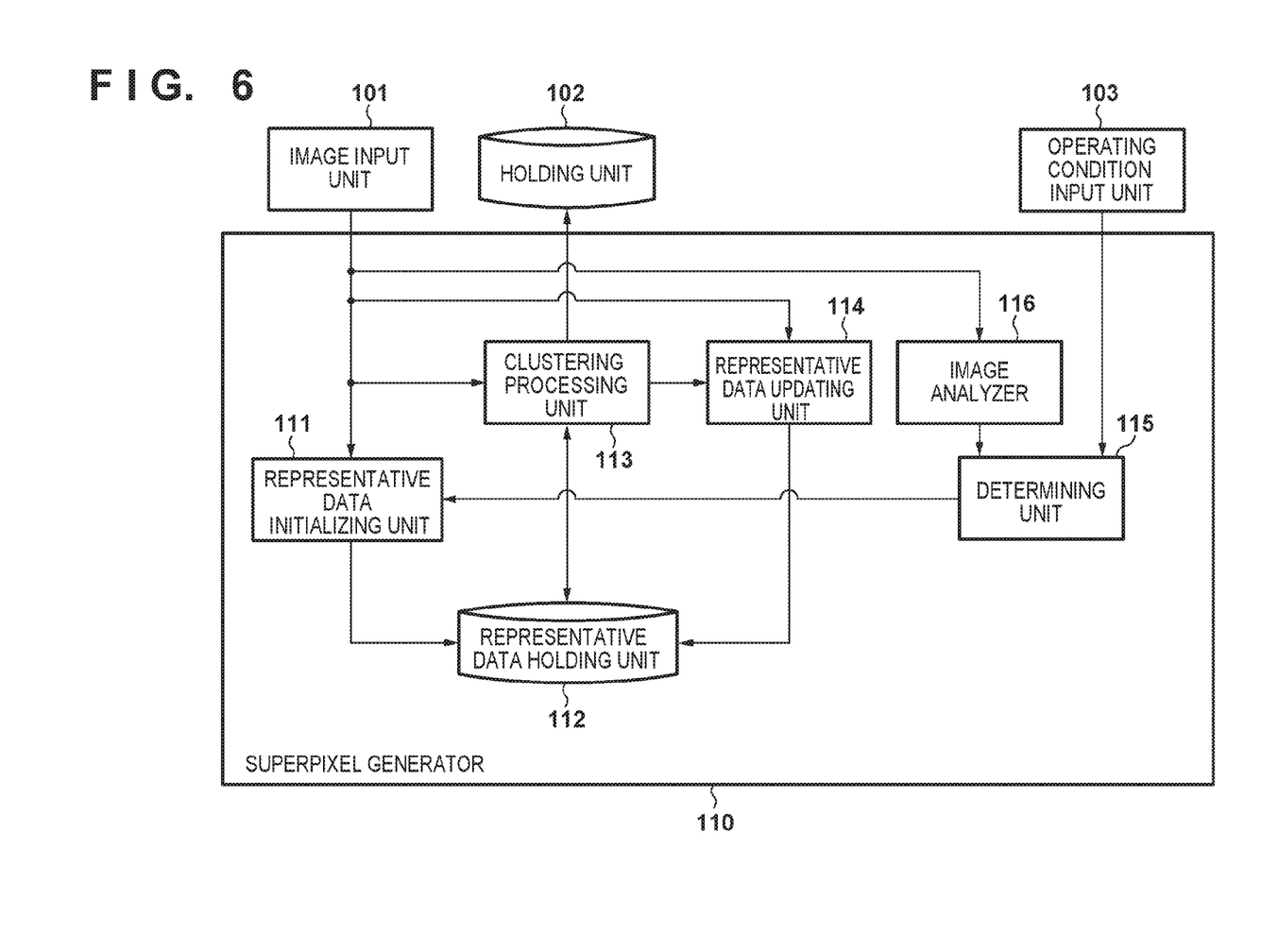
FIG. 6 is a block diagram showing the arrangement of a segmentation apparatus according to still another embodiment.

Furthermore, it is also effective to detect a change in image by using the analytical result of the image. FIG. 6 shows an arrangement in which an image analyzer 116 for analyzing an input image is added to FIG. 1 described earlier and the determining unit 115 refers to the output. The image analyzer 116 can detect, for example, the difference between the average luminance values of a preceding frame and present frame as a change in image. In this case, if the change in average luminance value exceeds a predetermined threshold value, the determining unit 115 determines to initialize representative data. As shown in FIG. 5A, the image analyzer 116 may also set partial areas in image data, and acquire a change in average luminance value in each partial area, thereby partially initializing representative data. FIG. 5A shows an example in which partial areas are set at equal intervals, that is, three partial areas are arranged at equal intervals in each of the horizontal direction and vertical direction in image data. The setting of partial areas is not limited to this example, and it is also possible to overlap partial areas such as partial areas 501 and 502 shown in FIG. 5B. Note that the method of wholly or partially initializing representative data by using the average luminance value has been explained as an example of image analysis. However, the present invention is not limited to this, and initialization determination may also be performed by using, for example, the difference between motion vectors or images.

Although the plurality of examples of the representative data initialization determination method have been explained, it is also possible to perform these determination methods by combining them. For example, when combining regular initialization of representative data and initialization using operation information, representative data is forcedly initialized without waiting for the regular initialization timing, if, for example, a pan operation is performed. By thus combining the initialization determination methods, it is possible to eliminate the problem that dead clusters are continuously accumulated, and obtain the effect of suppressing the decrease in segmentation accuracy.

In the first embodiment, the example in which the method based on SLIC is applied when generating a superpixel has been explained. However, the present invention is not limited to this example. The present invention is applicable to a case in which a dead cluster forms when segmentation is performed by clustering using representative data.

Also, the first embodiment has disclosed the example in which color information (R, G, B) is used as an image feature. However, it is also possible to use another color-space information such as CIELAB (l, a, b) or YCC (Y, Cb, Cr).

Furthermore, the first embodiment has disclosed the example in which clustering is performed using the total of five-dimensional information containing color information and coordinate information. However, it is also possible perform clustering by three-dimensional information by using only luminance as color information, or perform clustering by using information exceeding five dimensions by adding a feature amount. In addition, the example in which two-dimensional information of X and Y is used as coordinate information has been disclosed. However, it is also possible to perform clustering by using Z-axis information in the depth direction or T-axis information in the time direction.

Also, the example in which image clustering is repeated a predetermined number of times has been disclosed. However, the loop of clustering may also be terminated when, for example, representative data converges. In this case, the upper-limiting value of repetition can be set as the number of times of clustering for an image.

The present invention can also be implemented by processing by which a program for implementing one or more functions of the above-described embodiment is supplied to a system or apparatus via a network or storage medium, and one or more processors in a computer of the system or apparatus read out and execute the program. It is also possible to implement the present invention by a circuit (for example, an ASIC) for implementing one or more functions.

Figure 7:
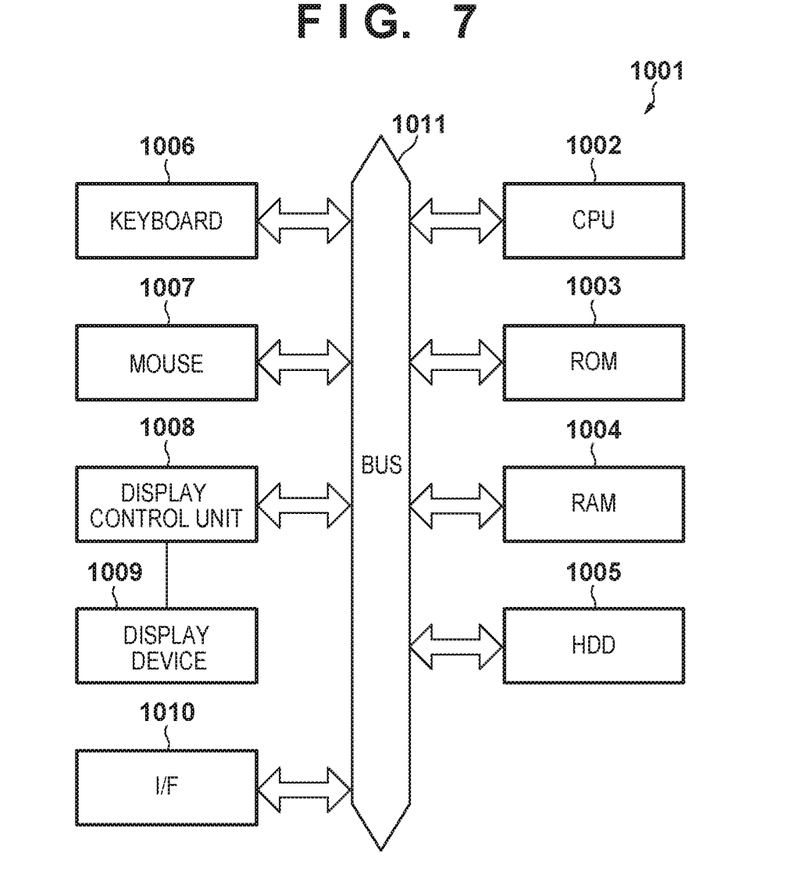
FIG. 7 is a block diagram showing a system configuration according to still another embodiment.

FIG. 7 is a block diagram showing the configuration of a system 1001 of a personal computer having a function capable of performing the segmentation method according to the present invention. Referring to FIG. 7, a CPU 1002 controls the whole system. A ROM 1003 stores a boot program and BIOS. A RAM 1004 is used as a work area of the CPU 1002. A hard disk drive (HDD) 1005 stores an OS, an application for forming segmentation information, and various kinds of data. A keyboard 1006 and mouse 1007 function as user interfaces. A display control unit 1008 incorporates a video memory and display controller. A display device 1009 receives a video signal from the display control unit 1008 and displays the signal. An interface 1010 communicates with various external devices. Device operation instructions and various sensor values input from the operating condition input unit 103 are input via the interface 1010. These data are exchanged via a bus 1011.

Figure 2A:
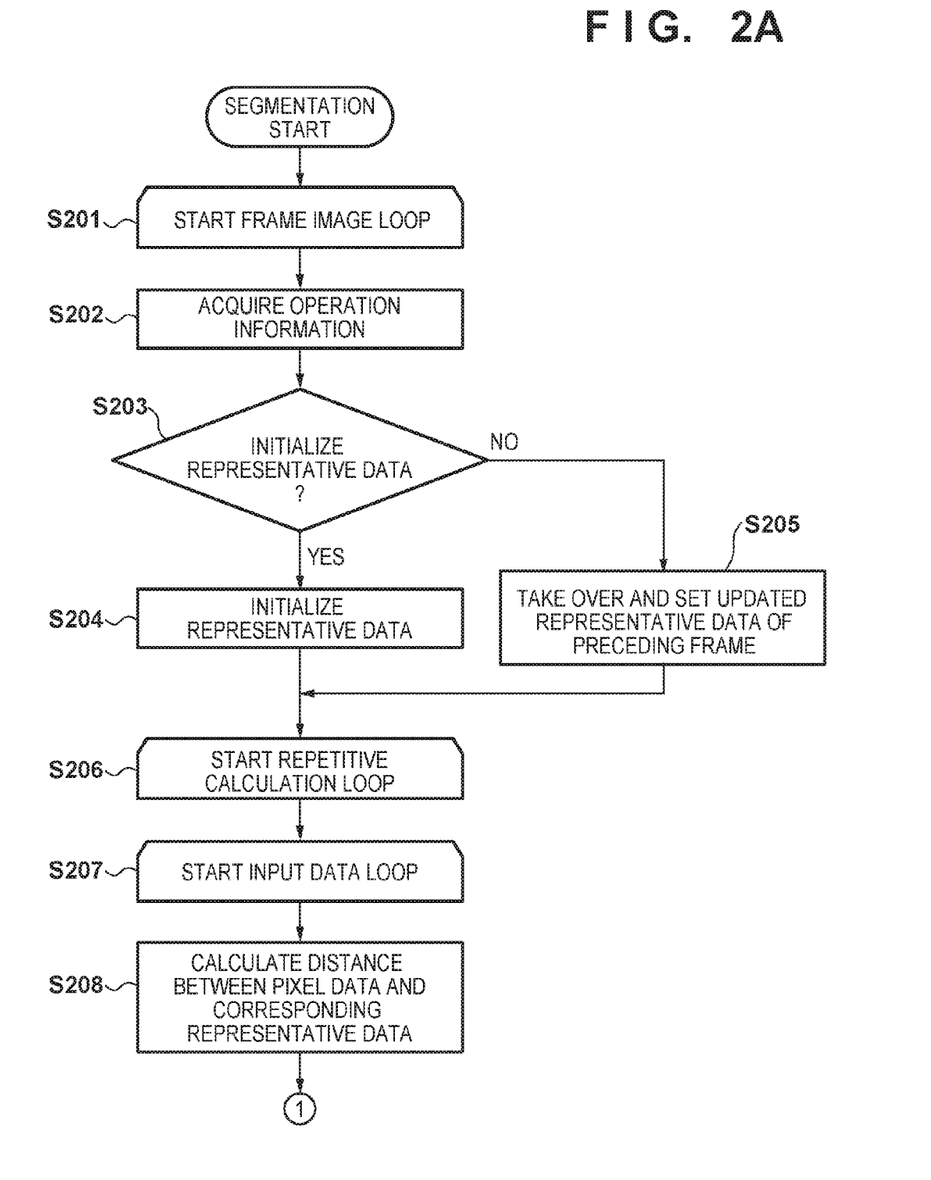
FIGS. 2A and 2B are flowcharts showing a segmentation process according to the embodiment.
Figure 2B:
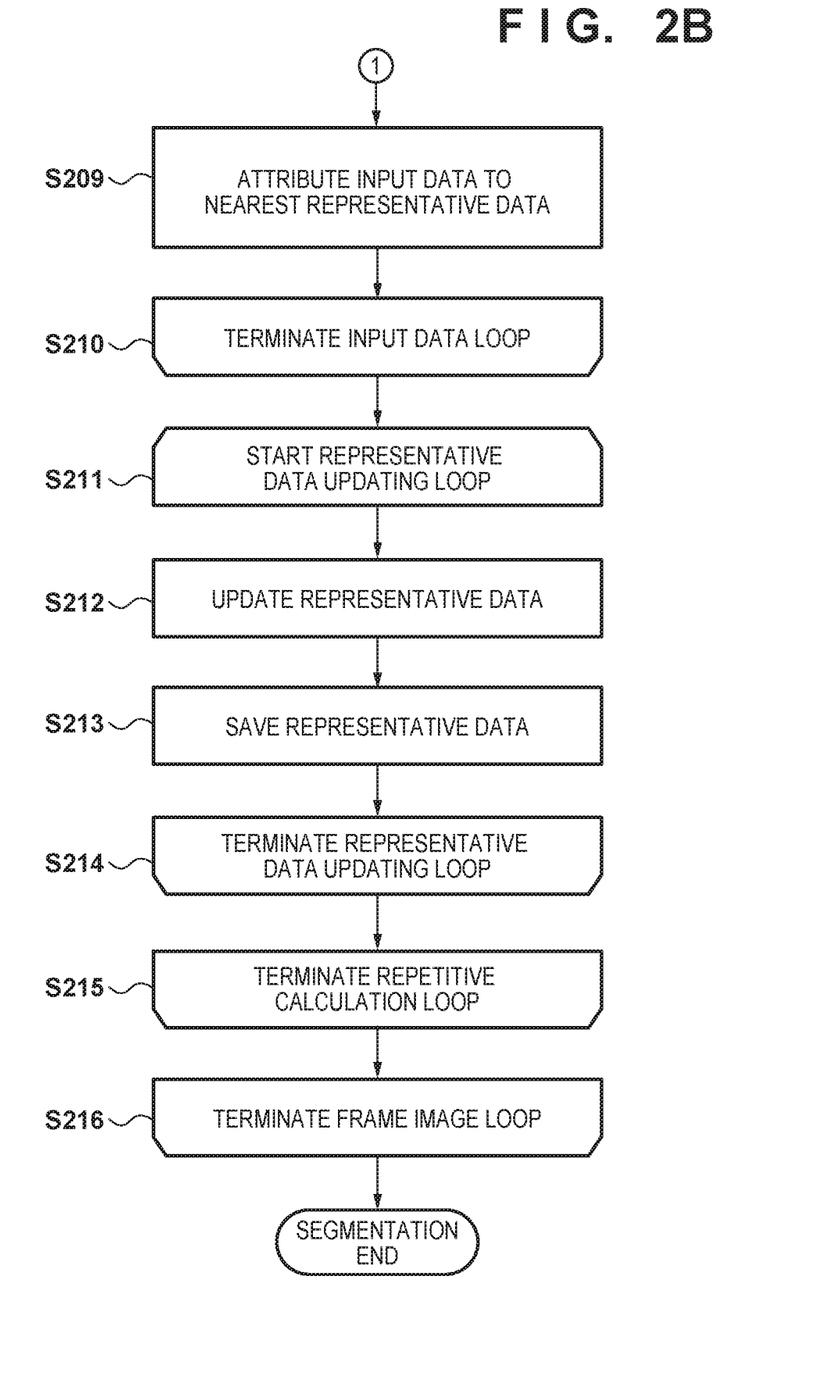
Figure 3A:
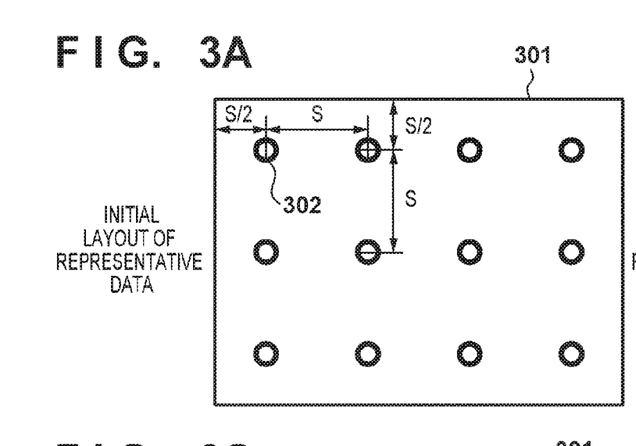
FIGS. 3A to 3D are views for explaining the initial layout of representative data and segmentation according to the embodiment.
Figure 3B:
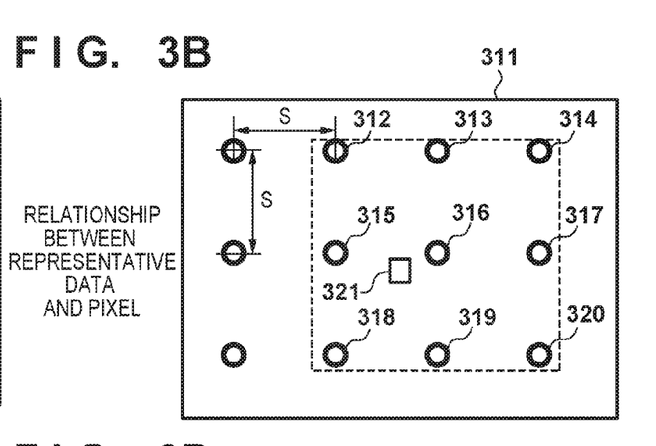
Figure 3C:
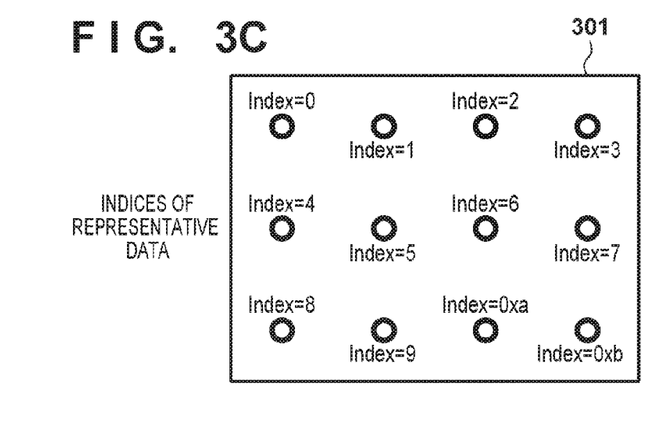
Figure 3D:
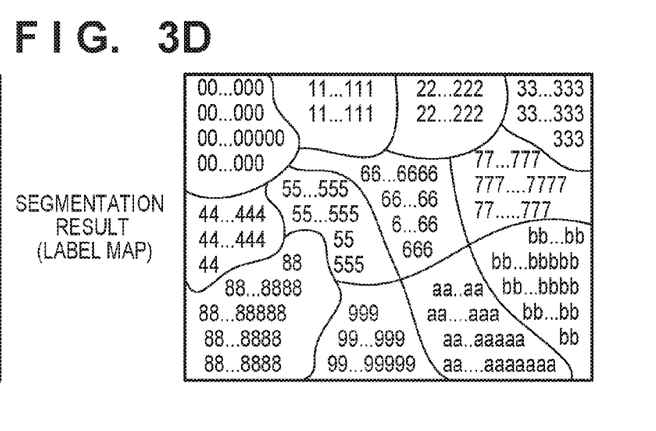

Software operating on the system 1001 shown in FIG. 7 performs the process of the flowcharts shown in FIGS. 2A and 2B in the first embodiment. The input image data described in the first embodiment is stored in the RAM 1004 or HDD 1005, and the process is started. The label map as the segmentation result saved in the area holding unit 102 and information of representative data are output to the RAM 1004 or HDD 1005. Also, the CPU 1002 performs the processes performed in the representative data initializing unit 111, clustering processing unit 113, representative data updating unit 114, and determining unit 115. Representative data saved in the representative data holding unit 112 is held in the RAM 1004 or an internal local memory (not shown) of the CPU and processed. However, the HDD 1005 may also be used if the number of representative data is very large.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-046343, filed Mar. 9, 2015 which is hereby incorporated by reference herein in its entirety.

What is claimed is:

1. An image processing apparatus comprising:
   one or more processors; and
   at least one memory coupled to the one or more processors, the at least one memory having instructions stored thereon which, when executed by the one or more processors, cause the image processing apparatus to:
   set representative data to be used in first clustering, for each of temporally continuous images;
   repeat clustering of pixels in an image based on the representative data;
   update the representative data while the clustering is repeated; and
   determine whether information representing an occurrence of change of contents in the temporally continuous images is input,
   wherein in setting the representative data for an image succeeding to another image in the temporally continuous images, initial representative data is set if it is determined that the information representing the occurrence of change is input, and representative data updated after last clustering of an immediately preceding image is set if it is not determined that the information representing the occurrence of change is input.

2. The apparatus according to claim 1, wherein the information representing the occurrence of change is operation information for an image capturing unit for capturing the image.

3. The apparatus according to claim 2, wherein the operation information is information indicating an operation of at least one of pan, tilt, and zoom for the image capturing unit.

4. The apparatus according to claim 1, wherein the information representing the occurrence of change is information indicating a switching operation of the image.

5. The apparatus according to claim 4, wherein
   when partial images corresponding to a plurality of partial areas obtained by dividing a captured image are input as the temporally continuous images, the information representing the occurrence of change is information which indicates switching of partial areas in the captured image.

6. The apparatus according to claim 1, wherein the information representing the occurrence of change is information sensed by a sensor for sensing a change in operation state of an image capturing unit for capturing the image.

7. The apparatus according to claim 6, wherein the sensor is an illuminance sensor.

8. The apparatus according to claim 6, wherein
   the image capturing unit is installed in a portable apparatus, and
   the sensor is one of an acceleration sensor and a gyro sensor.

9. The apparatus according to claim 1, wherein the information representing the occurrence of change is information indicating a difference between the current image and the immediately preceding image.

10. The apparatus according to claim 9, wherein the information representing the occurrence of change is information indicating a difference between the current image and the immediately preceding image, for each partial area obtained by dividing the image, and
    wherein in setting representative data to be used in the first clustering, respective representative data are set for a plurality of partial areas.

11. The apparatus according to claim 1, wherein
    the instructions, when executed by the one or more processors, further cause the image processing apparatus to set the initial representative data for the current image at a timing at which a predetermined time has elapsed.

12. The apparatus according to claim 11, wherein the instructions, when executed by the one or more processors, further cause image processing apparatus to determine the predetermined time in accordance with a capturing date/time of the image.

13. The apparatus according to claim 1, wherein the instructions, when executed by the one or more processors, further cause image processing apparatus to repeat the clustering in the image until a predetermined condition is satisfied.

14. The apparatus according to claim 1, wherein the instructions, when executed by the one or more processors, further cause image processing apparatus to repeat the clustering in the image a predetermined number of times.

15. An image processing method comprising:
setting representative data to be used in first clustering, for each of temporally continuous images;
repeating clustering of pixels in an image based on the representative data;
updating the representative data while the clustering is repeated; and
determining whether information representing an occurrence of change of contents in the temporally continuous images is input,
wherein in setting the representative data for an image succeeding to another image in the temporally continuous images, initial representative data is set if it is determined that the information representing the occurrence of change is input, and representative data updated after last clustering of an immediately preceding image is set if it is not determined that the information representing the occurrence of change is input.

16. A non-transitory computer-readable storage medium storing a computer program which, when read and executed by a computer, causes the computer to execute:
setting representative data to be used in first clustering, for each of temporally continuous images;
repeating clustering of pixels in an image based on the representative data;
updating the representative data while the clustering is repeated; and
determining whether information representing an occurrence of change of contents in the temporally continuous images is input,
wherein in setting the representative data for an image succeeding to another image in the temporally continuous images, initial representative data is set if it is determined that the information representing the occurrence of change is input, and representative data updated after last clustering of an immediately preceding image is set if it is not determined that the information representing the occurrence of change is input.

* * * * *